United States Patent [19]

Ohta et al.

[11] Patent Number: 4,567,124
[45] Date of Patent: Jan. 28, 1986

[54] ELECTROPHOTOGRAPHIC ELEMENT WITH TRISAZO PHOTOCONDUCTOR AND AN AMINE SUBSTITUTED CHARGE TRANSFER MATERIAL

[75] Inventors: Masafumi Ohta; Masaomi Sasaki, both of Susono; Masayuki Shoshi, Numazu, all of Japan

[73] Assignee: Ricoh Co., Ltd., Tokyo, Japan

[21] Appl. No.: 670,176

[22] Filed: Nov. 9, 1984

[30] Foreign Application Priority Data

Nov. 14, 1983 [JP] Japan .................. 58-213836

[51] Int. Cl.[4] .......................... G03G 5/06; G03G 5/14
[52] U.S. Cl. ........................................ 430/59; 430/79
[58] Field of Search .................. 430/59, 73, 74, 79

[56] References Cited

U.S. PATENT DOCUMENTS 4,450,218  5/1984  Takei et al. ....................... 430/59
4,507,471  3/1985  Ohta ................................. 430/73 X
4,515,883  5/1985  Sasaki ............................... 430/73 X

FOREIGN PATENT DOCUMENTS 3220208  12/1982  Fed. Rep. of Germany ........ 430/59

Primary Examiner—Roland E. Martin
Attorney, Agent, or Firm—Flynn, Thiel, Boutell & Tanis

[57] ABSTRACT

The present invention provides an multilayer type electrophotographic element comprising laminating a charge generating layer containing a trisazo pigment represented by the general formula (1) on an electrically conductive substrate:

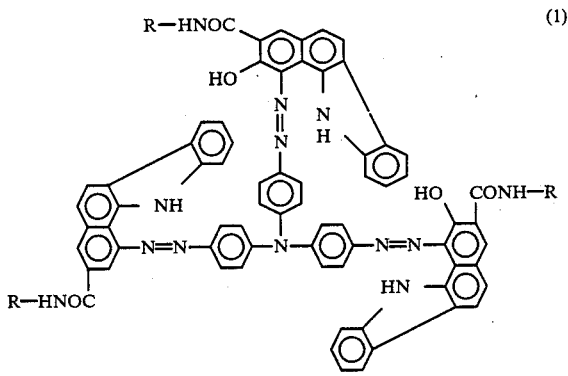

(wherein, R denotes

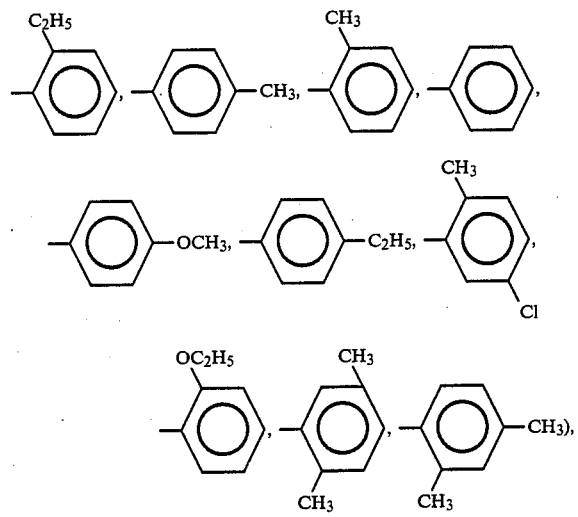

and laminating a charge transfer layer containing an α-substituted stilbene compound represented by the general formula (2):

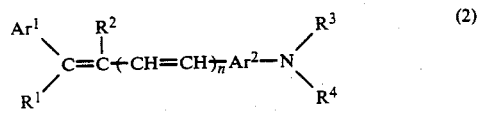

(wherein, $R^1$ denotes a substituted or unsubstituted alkyl group or a substituted or unsubstituted aryl group, $R^2$, $R^3$, and $R^4$ each denotes a substituted or unsubstituted alkyl group or a substituted or unsubstituted aryl group, and $Ar^2$ denotes a substituted or unsubstituted arylene group. $Ar^1$ and $R^1$ may be combined to form a ring. n is an integer of 0 or 1) and a resinous binder, on the charge generating layer.

7 Claims, 1 Drawing Figure

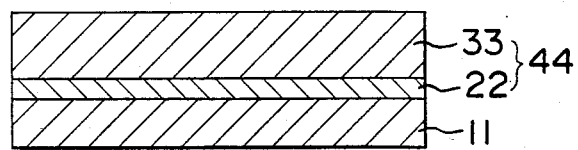

ELECTROPHOTOGRAPHIC ELEMENT WITH TRISAZO PHOTOCONDUCTOR AND AN AMINE SUBSTITUTED CHARGE TRANSFER MATERIAL

BACKGROUND OF THE INVENTION (a) Field of the Invention

The present invention relates to an element for use in electrophotography, and in more detail relates to a multilayer-type electrophotographic element comprising a charge generating layer containing a substance which generates a charge carrier when exposed to light radiation (which will hereinafter be referred to as a charge generating substance) and a charge transfer layer containing a substance which receives the charge carrier generated by the charge-generating layer and transfers said charge carrier (which will hereinafter be referred to as a charge transfer substance).

(b) Description of the Prior Art

Typical elements for use in electrophotography include inorganic systems using either selenium and its alloy or one comprising dispersing a dye-sensitized zinc oxide in a binder resin, and an organic system using a charge transfer complex comprising 2,4,7-trinitro-9-fluorenone (which will be referred to hereinafter as TNF.) and poly-N-vinylcarbozole (which will hereinafter be referred to as PVK.). However, the fact is that these electrophotographic elements are possessed of various merits as well as various demerits. For instance, the selenium electrophotographic element used widely now is defective in that its manufacture is difficult, the manufacturing cost is expensive, it is difficult to work said element into a belt due to lack of flexibility, and additionally, attention must be paid to its handling because it is sensitive to heat and mechanical impact. The zinc oxide electrophotographic element is inexpensive to manufacture cost because it can be made by coating a substrate, with a low cost zinc oxide but is defective in mechanical properties such as surface smoothness, hardness, tensile strength, abrasion resistance and the like. Therefore, said zinc oxide electrophotographic element encounters various problems, such as durability and the like, when used repeatedly as the electrophotographic in a common paper copying machine. The electrophotographic element using the charge transfer complex comprising TNF and PVK is inferior in sensitivity compared to other elements, and is unsuitable as the electrophotographic element for use in a high speed copying machine.

In recent years, wide investigations have been carried out in order to eliminate the drawbacks inherent in these electrophotographic elements. As a result, various organic system electrophotographic elements have been proposed. Among them, a multilayer-type electrophotographic element, which comprises a charge generating layer made by forming a thin film of an organic pigment on an electrically conductive substance and a charge transfer layer, superposed on said charge generating layer, which consists essentially of a charge transfer substance, is attracting public attention. As the electrophotographic element for use in the plain paper copying machine, said multilayer type electrophotographic element is normally superior in sensitivity, stable in chargeability and the like, as compared with usual organic system electrophotographic elements.

As usual multilayer type electrophotographic elements of this sort, the following ones are well known, that is (1) one having used a perylene derivative in the charge generating layer and an oxadiazole derivative in the charge transfer layer see U.S. Pat. No. 3,871,882), (2) one comprising a charge generating layer formed by coating Chloro Dian Blue by using an organic amine as a solvent and the charge transfer layer using a pyrazoline derivative therein (see Japanese Laid Open Patent Application No. 55643/1977 and Japanese Laid Open Patent Application No. 72231/1977), and (3) one comprising a charge generating layer formed by coating a dispersion prepared by dispersing a triphenylamine system trisazo pigment (see Japanese Laid Open Patent Application No. 132347/1978) for instance in a dispersion medium of tetrahydrofuran or the like, and the charge transfer layer using 2,5-bis(4-diethylaminophenyl)-1,3,4-oxadiazole or TNF.

However, the fact is that the usual multilayer-type electrophotographic elements of this sort possess various merits as well as various demerits.

For instance, the electrophotographic element using a perylene derivative and an oxadiazole derivative therein as shown above in (1) surely raises no question of practical use, but is inferior in sensitivity when used in a high-speed copying machine. Further, in this electrophotographic element, a perylene derivative, a charge generating substance controlling the spectral sensitivity of this electrophotographic element, is not absorptive to the overall visible light region. Therefore, this electrophotographic element is defective in that it is unsuitable for use in a color copying machine.

The electrophotographic element using Chloro Dian Blue and a pyrazoline derivative therein, shown above in (2), is observed to have a comparatively superior sensitivity according to our experiments, but is defective because in its preparation it is necessary to use an organic amine (for instance, ethylenediamine) which is generally difficult to handle, as coating solvent for forming the charge generating layer.

The electrophotographic element shown in (3) above is the one which we proposed. This electrophotographic element is advantageous in that is charge generating layer can be formed with ease by coating a pigment dispersion, obtained by dispersing fine pigment particles in an organic solvent (if needed, a binder resin may be added) onto a substrate, but is somewhat inferior in sensitivity. Due to this, this electrophotographic element is insufficient as the one for use in a high-speed copying machine.

In recent years the demand for an electrophotographic element for use in a laser printer has been rising, in particular, development of an electrophotographic element which is highly sensitive to the wavelength region of semiconductor laser is in demand. However, it is a fact that the above-mentioned electrophotographic elements can not be put to practical use because said elements are extremely low in sensitivity to the semiconductor laser.

The mechanism for a multilayer-type electrophotographic element of this sort forming an electrostatic latent image is considered to consist of the following when the charged electrophotographic element is exposed to radiation of light, the light passes through the transparent charge transfer layer and is absorbed by the charge generating substance contained in the charge generating layer. The charge generating substance, having absorbed the light, generates a charge carrier. This charge carrier is injected into the charge transfer layer, transfers through the charge transfer layer along the electric field having been caused by charging and neutralizes the charge present on the surface of the electrophotographic element to thereby form an electrostatic latent image. Accordingly, the charge generating substance used in the electrophotographic element of this sort is demanded to generate the charge carrier efficiently when exposed to radiation of light for image formation.

The charge transfer substance is required to be transparent to the light used, to be capable of maintaining a predetermined charge potential and to be capable of promptly transferring the charge carrier generated by the charge generating substance.

SUMMARY OF THE INVENTION

In view of the above points, we have been devoted to the study of various charge generating substances and charge transfer substances for the purpose of developing a multilayer-type electrophotographic element which is high in sensitivity, displays a substantially flat sensitivity to the overall visible light region and the wavelength region of the semi-conductor laser and is easy to manufacture. It has been found that as the charge generating substance, the trisazo pigment represented by the general formula (1) referred to hereinbelow is widely different in characteristics depending on the kind and location of the substituent R and the trisazo pigment with R as shown afterwards is of an especially superior characteristic, and that the combination of the charge generating substance and the charge transfer substance varies the characteristic of the electrophotographic element to be produced. We have obtained the electrophotographic element having a superior electrophotographic characteristic by the specific combination thereof and achieved the above mentioned object.

The object of the present invention is to provide a multilayer-type electrophotographic element comprising laminating a charge generating layer containing a charge generating substance with an extremely superior charge carrier generating ability and a charge transfer layer containing a charge transfer substance displaying a superior ability when used together with said charge generating substance, wherein said multilayer type electrophotographic element is designed to carry a sufficient charged potential in the dark and dissipate the surface potential promptly when exposed to radiation of light, the copying process comprising repetition of charge, exposure, development, transfer and cleaning does not undergo any characteristic change from repetition of these steps.

The multilayer-type electrophotographic element according to the present invention comprising laminating a charge generating layer and a charge transfer layer on an electrically conductive substrate, is characterized in that said generating layer contains a trisazo pigment represented by the general formula (1):

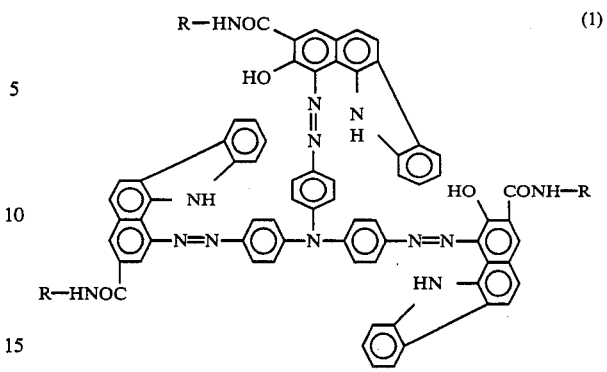

(wherein, R denotes

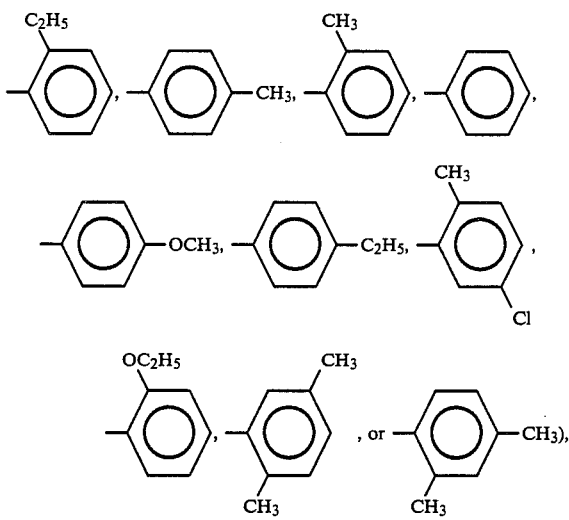

and said charge transfer layer contains an α-substituted stilbene compound represented by the general formula (2):

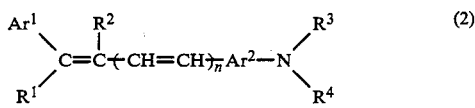

(wherein, $R^1$ denotes a substituted or unsubstituted alkyl group or a substituted or unsubstituted aryl group, $R^2$, $R^3$ and $R^4$ each denotes a hydrogen atom, a substituted or unsubstituted alkyl group or a substituted or unsubstituted aryl group, $Ar^1$ denotes a substituted or unsubstituted aryl group, and $Ar^2$ denotes a substituted or unsubstituted arylene group. $Ar^1$ and $R^1$ may be combined to form a ring and n is an integer of 0 or 1. ) and a resinous binder.

As concrete examples of the alkyl group denoted by $R^1$, $R^2$, $R^3$ and $R^4$ as found in general formula (2) there can be enumerated a methyl group, an ethyl group, a propyl group, a butyl group, a pentyl group, a hexyl group or the like. As concrete examples of the substitutent of the substituted alkyl group there can be enumerated an alkoxy group, such as a methoxy group, an ethoxy group, a propoxy group, a butoxy group, a pentyloxy group or the like; an aryloxy group, such as a phenoxy group, a tolyloxy group, naphthyloxy group or the like; an substituted or unsubstituted aryl group, such as a phenyl group, a substituted phenyl group like a methoxy-substituted phenyl group, a naphthyl group or the like; an alkylamino group, such as N-methyl-N-ethylamino group, N,N-dimethylamino group, N,N-diethylamino group or the like; and an arylamino group, such as N-phenylamino group, N,N-diphenylamino group or the like; an amino group; a hydroxy group or the like. The number of substituents of the substituted alkyl group may be one or two or more. In the case of two or more substitutents, the groups may be the same or different.

As the aryl groups denoted by $R^1$, $R^2$, $R^3$, $R^4$ and $Ar^1$ in the general formula (2) there can be enumerated carbocyclic or heterocyclic mononuclear or polynuclear aromatic residual groups, more specifically a phenyl group, a naphthyl group, an anthryl group, a thienyl group, a pyridyl group, a furyl group, a carbazolyl group, a styryl group and the like. As the substituents of the substituted aryl group there can be enumerated an alkylamino group, such as N,N-dimethylamino group, N,N-diethylamino group, N,N-dipropylamino group, or the like; an alkoxy group such as a methoxy group, an ethoxy group, a propoxy group, a butoxy group or the like; an aryloxy group, such as a phenoxy group, a tolyloxy group, naphtyloxy group or the like; an alkyl group, such as a methyl group, an ethyl group, a propyl group, a butyl group or the like; an amino group, a hydroxy group; a phenyl group, a halogen atom, such as a chlorine atom, a bromine atom or the like; a cyano group, nitro group; an alkylthio group, such as a methylthio group, an ethylthio group or the like; and an arylthio group, such as a phenylthio group, a naphthylthio group or the like. The number of substituents of the substituted aryl group may be one or two or more. In the case of two or more substituents, the groups may be the same or different.

As the arylene group denoted by $Ar^2$ of the general formula (2) there can be enumerated the same ones as shown in the examples of carbocyclic or heterocyclic mononuclear or polynuclear aromatic residual groups of the above mentioned aryl groups. As the substituent of the substituted arylene group there can be enumerated the same ones as shown in the examples of substituents of the above mentioned aryl groups. The number of substituents of the substituted arylene group may be one or two or more. In the case of two or more substituents, the groups may be the same or different.

As the rings formed by the combination of $Ar^1$ and $R^1$ there can be enumerated fluorenylidene, cyclopentadienylidene, cychlohexenylidene, cyclohexadienylidene, cyclopentanylidene and the like. These rings may be substituted by the same substituents as enumerated in the definition of $Ar^1$ and $R^1$.

The α-substituted stilbene compound represented by the above-mentioned general formula (2) is prepared by reacting the aryl derivative represented by the general formula (3):

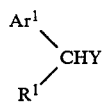
(3)

wherein, $Ar^1$ and $R^1$ are as defined in the general formula (2). Y is a triphenylphosphonium group or trialkylphosphonium group represented by $-P^{\oplus}(R^5)_3 Z^{\ominus}$ (wherein, $R^5$ denotes a phenyl group or lower alkyl group, and $Z^{\ominus}$ denotes a halogen ion) or a dialkyl phosphorous acid group represented by $-PO(OR^6)_2$ (wherein, $R^6$ denotes a lower alkyl group), with the carbonyl compound represented by the general formula (4):

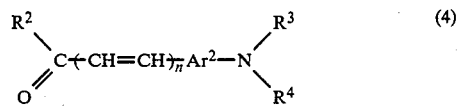

wherein, $R^2$, $R^3$, $R^4$, $Ar^2$ and n are as defined in the general formula (2).

The aryl derivative represented by the general formula (3) can be obtained readily by heating the corresponding halomethyl compound together with triphenylphosphine or alkylphosphine, or trialkyl phosphite directly or in a solvent such as toluene, xylene or the like. The alkyl group for use in trialkylphosphine is preferred to have 1-4 carbon atoms, in particular, a butyl group is preferable. The alkyl group for use in trialkyl phosphite is preferred to have 1-4 carbon atoms, in particular, a methyl group or an ethyl group is preferable.

The reaction between the thus obtained aryl derivative represented by the general formula (3) and the carbonyl compound represented by the general formula (4) is carried out in a solvent, in the presence of a basic catalyst and at a temperature from room temperature to about 100° C.

As the basic catalyst there can be enumerated caustic soda, caustic potash, sodium amide, sodium hydroxide, and alcholate such as sodium methylate, potassium-t-butoxide and the like.

As the reaction solvent there can be enumerated methanol, ethanol, isopropanol, butanol, 2-methoxy ethanol, 1,2-dimethoxy ethane, bis(2-methoxyethyl)ether, dioxane, dimethylsulfoxide, N,N-dimethylformamide, N-methylpyrolidone, 1,3-dimethyl-2-imidazolidinone and the like. Among them, polar solvents such as N,N-dimethylformamide and dimethylsulfoxide are suitable.

The reaction temperature can be selected from a wide range, taking into consideration (1) the stability of a solvent used relative to the basic catalyst, (2) the reactivity of condensation components (compounds represented by the general formula (3) and the general formula (4)), and (3) the reactivity of said basic catalyst as a condensing agent in the solvent. For instance, when using the polar solvent, the actual reaction temperature is in the range of from room temperature to 100° C., preferably in the range of from room temperature to 80° C. However, when shortening the reaction time or using a condensing agent having a low activity, the reaction temperature may be raised.

On the other hand, the trisazo pigment represented by the general formula (1) and used in the charge generating layer of the present invention is a well known substance and manufactured by the method disclosed in Japanese Laid Open Patent Application 195767/1982 and the like.

Examples of the trisazo pigment obtained in the above mentioned manner and represented by the general formula (1) and examples of the α-substituted stilbene compound represented by the general formula (2) are shown in Table-1 and Table-2 respectively.

TABLE 1
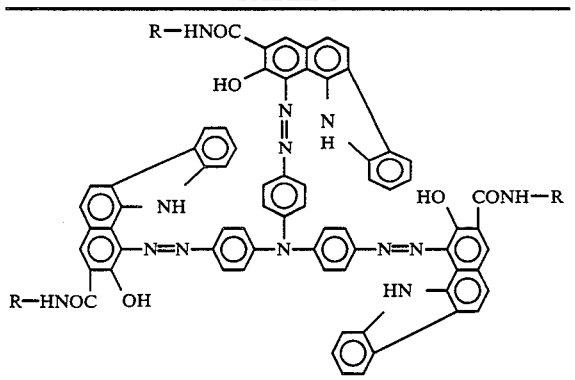 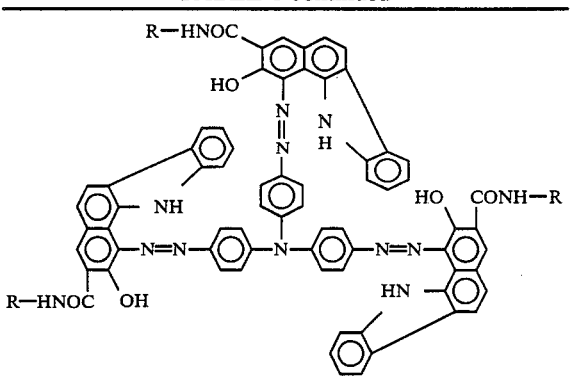
| Trisazo Pigment No. | R |
|---|---|
| 1-1 | 2-ethylphenyl |
| 1-2 | 4-methylphenyl |
| 1-3 | 2-methylphenyl |
| 1-4 | phenyl |
| 1-5 | 4-methoxyphenyl |
| 1-6 | 4-ethylphenyl |
| 1-7 | 2-methyl-4-chlorophenyl |
| 1-8 | 2-ethoxyphenyl |
| 1-9 | 3,5-dimethylphenyl |
| 1-10 | 2,4-dimethylphenyl |
TABLE 2
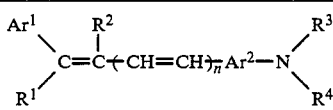
| Compound No. | Ar$^1$ | R$^1$ | R$^2$ | n | Ar$^2$ | R$^3$ | R$^4$ |
|---|---|---|---|---|---|---|---|
| 2-1 | phenyl | CH$_3$ | H | 0 | p-phenylene | CH$_3$ | CH$_3$ |
| 2-2 | " | " | " | " | " | CH$_3$ | phenyl |
| 2-3 | " | " | " | " | " | CH$_2$-phenyl | phenyl |

TABLE 2-continued $$\begin{matrix} Ar^1 & R^2 & & & R^3 \\ \diagdown & | & & & \diagup \\ C=C+CH=CH\frac{}{}_{n}Ar^2-N \\ \diagup & | & & & \diagdown \\ R^1 & & & & R^4 \end{matrix}$$

| Compound No. | Ar¹ | R¹ | R² | n | Ar² | R³ | R⁴ |
|---|---|---|---|---|---|---|---|
| 2-4 | " | " | " | " | " |  |  |
| 2-5 | " | " | " | " | " | 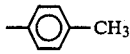—CH₃ | —CH₃ |
| 2-6 | " | " | " | " | " | 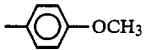—OCH₃ |  |
| 2-7 | " | " | " | " | " | 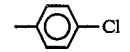—Cl | " |
| 2-8 | " | " | " | 1 | " | 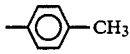—CH₃ | —CH₃ |
| 2-9 | " | " | —N(CH₃)₂ | 0 | " | CH₃ | CH₃ |
| 2-10 | " | " | —N(C₂H₅)₂ | " | " | C₂H₅ | C₂H₅ |
| 2-11 | " | " |  | " | " |  |  |
| 2-12 | 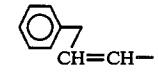CH=CH— | " | H | " | " | " | " |
| 2-13 |  | " | " | " | " | " | " |
| 2-14 | 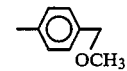OCH₃ | " | " | " | " | 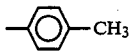—CH₃ | —CH₃ |
| 2-15 |  | C₂H₅ | " | " | " | " | " |
| 2-16 | " | C₃H₇(n) | " | " | " | " | " |
| 2-17 | " | C₄H₉(n) | " | " | " | " | " |
| 2-18 |  | C₂H₅ | " | " | " |  |  |
| 2-19 |  | " | " | 1 | " | " | " |
| 2-20 | " | " | " | " | " | 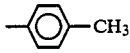—CH₃ | —CH₃ |
| 2-21 | " | CH₂ | " | 0 | " |  |  |
| 2-22 | " | " | " | " | " | C₂H₅ | C₂H₅ |

TABLE 2-continued $$\underset{R^1}{\overset{Ar^1}{C}}=\underset{}{\overset{R^2}{C}}{-}(CH=CH)_{\overline{n}}Ar^2-N\underset{R^4}{\overset{R^3}{\diagdown}}$$

| Compound No. | Ar¹ | R¹ | R² | n | Ar² | R³ | R⁴ |
|---|---|---|---|---|---|---|---|
| 2-23 | " | " | " | " | " | " | —C₆H₅ |
| 2-24 | " | " | " | " | " | —C₆H₄—CH₃ | —C₆H₄—CH₃ |
| 2-25 | " | " | " | " | " | CH₂—C₆H₅ | —C₆H₅ |
| 2-26 | " | " | " | " | " | —C₆H₄—OCH₃ | —C₆H₄—OCH₃ |
| 2-27 | " | " | " | " | " | —C₆H₄—CH₃ | —C₆H₅ |
| 2-28 | —C₆H₄—OCH₃ | " | " | " | " | " | —C₆H₄—CH₃ |
| 2-29 | " | CH₂—C₆H₄—OCH₃ | " | " | " | " | " |
| 2-30 | " | " | " | " | " | —C₆H₅ | —C₆H₅ |
| 2-31 | —C₆H₅ | CH₂—C₆H₅ | " | 1 | " | —C₆H₄—CH₃ | —C₆H₄—CH₃ |
| 2-32 | naphthyl | " | " | 0 | " | —C₆H₅ | —C₆H₅ |
| 2-33 | —C₆H₅ | —C₆H₅ | " | " | " | " | " |
| 2-34 | " | " | " | " | " | " | —C₆H₄—CH₃ |
| 2-35 | " | " | " | " | " | " | —C₆H₄—CN |
| 2-36 | " | " | " | " | " | " | —C₆H₃(CH₃)₂ |
| 2-37 | " | " | " | " | " | —C₆H₄—CH₃ | —C₆H₄—CH₃ |
| 2-38 | " | " | " | " | naphthyl | —C₆H₅ | —C₆H₅ |

TABLE 2-continued $$Ar^1\underset{R^1}{\overset{R^2}{C=C}}(CH=CH)_{\overline{n}}Ar^2-N\underset{R^4}{\overset{R^3}{}}$$

| Compound No. | Ar¹ | R¹ | R² | n | Ar² | R³ | R⁴ |
|---|---|---|---|---|---|---|---|
| 2-39 | " | " | " | " | naphthyl | " | " |
| 2-40 | " | " | " | " | thienyl (S) | –C₆H₄–CH₃ | –C₆H₄–CH₃ |
| 2-41 | –C₆H₄–CH₃ | " | " | " | –C₆H₄– | –C₆H₅ | –C₆H₅ |
| 2-42 | –C₆H₄–OCH₃ | " | " | " | " | " | " |
| 2-43 | –C₆H₄–Cl | " | " | " | " | " | " |
| 2-44 | –C₆H₄–CH₃ | –C₆H₄–CH₃ | " | " | " | " | " |
| 2-45 | –C₆H₄–OCH₃ | –C₆H₄–OCH₃ | " | " | " | " | " |
| 2-46 | –C₆H₅ | –C₆H₅ | " | " | " | –C₆H₄–OCH₃ | –C₆H₄–OCH₃ |
| 2-47 | " | " | " | " | " | –C₆H₅ | " |
| 2-48 | " | " | –C₆H₄–N(CH₃)₂ | " | " | CH₃ | CH₃ |
| 2-49 | " | " | H | " | dichlorophenyl (Cl) | " | " |
| 2-50 | " | " | " | " | N-ethyl-dimethylcarbazolyl (N–C₂H₅) | –C₆H₅ | –C₆H₅ |
| 2-51 | " | " | " | " | –C₆H₄– | C₂H₅ | C₂H₅ |
| 2-52 | " | " | " | " | " | CH₂–C₆H₅ | CH₂–C₆H₅ |
| 2-53 | " | " | CH₃ | " | " | –C₆H₅ | –C₆H₅ |
| 2-54 | " | " | –C₆H₅ | " | " | C₂H₅ | C₂H₅ |

TABLE 2-continued
$$\underset{R^1}{\overset{Ar^1}{>}}C=\underset{}{\overset{R^2}{C}}(CH=CH)_{\overline{n}}Ar^2-N\underset{R^4}{\overset{R^3}{<}}$$
| Compound No. | Ar¹ | R¹ | R² | n | Ar² | R³ | R⁴ |
|---|---|---|---|---|---|---|---|
| 2-55 | " | " | " | " | " |  |  |
| 2-56 | " | " | H | 1 | " | 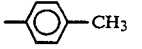 | 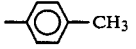 |
| 2-57 | " | " | " | " | " |  |  |
| 2-58 |  | " | " | 0 | " | " | " |
| 2-59 | " | " | " | " | " | 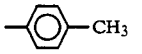 | 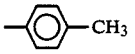 |
| 2-60 | 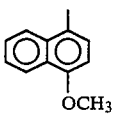 | " | " | " | " | " | " |
| 2-61 | 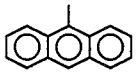 | " | " | " | " |  |  |
| 2-62 | 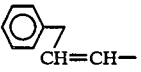 | " | " | " | " | " | " |
| 2-63 |  |  | " | " | " | " | " |
| 2-64 | " | " | " | " | " | 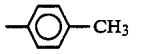 | 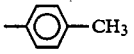 |
| 2-65 |  | | " | " | " |  |  |
| 2-66 | " | | " | " | " | 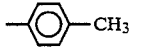 | 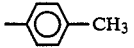 |
| 2-67 | " | " | " | " | " | " |  |
| 2-68 | " | " | " | " | " | 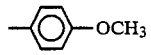 | " |
| 2-69 | " | " | " | " | " | C₂H₅ | " |
| 2-70 |  | | " | " | " |  | " |

TABLE 2-continued $$\underset{R^1}{\overset{Ar^1}{>}}C=\underset{R^1}{\overset{R^2}{C}}(CH=CH)_n Ar^2-N\underset{R^4}{\overset{R^3}{<}}$$

| Compound No. | Ar¹ | R¹ | R² | n | Ar² | R³ | R⁴ |
|---|---|---|---|---|---|---|---|
| 2-71 | " | " | " | " | " | 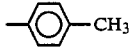—CH₃ | 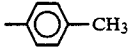—CH₃ |
| 2-72 |  | " | " | " | " | " | " |
| 2-73 | " | " | " | " | " |  |  |
| 2-74 |  | " | " | " | " | " | " |
| 2-75 | " | " | " | " | " | 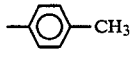—CH₃ | 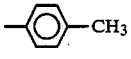—CH₃ |
| 2-76 | 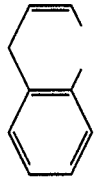 | " | " | " | " | " | " |
| 2-77 | " | " | " | " | " |  |  |
| 2-78 |  | CH₃ | " | " | " | CH₂— | CH₂— |
| 2-79 | " | " | " | 1 | " | CH₃ | CH₃ |
| 2-80 | " |  | " | 0 | —Cl | CH₂— | CH₂— |
| 2-81 | " | " | " | " | —CH₃ | " | " |
| 2-82 | " | " | " | 1 |  | CH₃ | CH₃ |

Next, the present invention will be explained in more detail with reference to the drawing.

The accompanying drawing is an enlarged sectional view of the electrophotographic element showing one embodiment of the present invention. This electrophotographic element comprises forming a photosensitive layer 44 consisting of a charge generating layer 22 and a charge transfer layer 33 on electrically conductive substrate.

As the electrically conductive substrate there are used metal plates, metal drums and metal foils of aluminum, nickel, chromium and the like; plastic films provided with thin layers of aluminum, tin oxide, indium oxide, chromium, palladium and the like; and paper or plastic film coated or impregnated with an electrically conductive substance, and the like.

The charge generating layer is formed in the manner of pulverizing the specific trisazo pigment represented by the above mentioned general formula (1) by means of a ball mill or the like and coating the electrically conductive substrate with a dispersion obtained by dispersing said fine powders in a proper solvent or dissolving a binder resin therein as occasion demands.

The thus formed charge generating layer is further subjected to surface finishing by buffing or the like and is further treated to control film thickness as occasion demands. The binder resins used herein include polyester resin, butyral resin, ethyl cellulose, epoxy resin, phenoxy resin, acryl resin, vinylidene chloride resin, polystryene resin, polybutadiene resin and copolymers thereof. These binder resins are used singly or in combination of two or more.

The thickness of the charge generating layer is 0.01-5 μm, preferably 0.05-2 μm, and the percentage of the trisazo pigment in this layer is 10-100 wt.%, preferably 30-95 wt.%. When the thickness of the charge generating layer is less than 0.01 μm, the sensitivity deteriorates, and when said thickness is more than 5 μm, holding of potential deteriorates. When the percentage of the trisazo pigment in the charge generating layer is less than 10 wt.%, the sensitivity deteriorates.

The charge transfer layer is formed by dissolving the α-substituted stilbene compound represented by the aforesaid general formula (2) and the binder resin in a proper solvent such, for instance, as tetrahydrofuran or the like and coating the resulting solution on said charge generating layer. The binder resin used herein includes polycarbonate resin, polyester resin, polystyrene resin, polyurethane resin, epoxy resin, phenoxy resin, acryl resin, silicone resin and copolymers thereof. These resins may be used singly or in the combination of two or more. Various additives may be added to the charge transfer layer for the purpose of improving its flexibility or durability. The additives used for this purpose include halogenated paraffin, dialkyl phthalate, silicone oil and the like.

The percentage of the α-substituted stilbene compound contained in the charge transfer layer is 10-80 wt.%, preferably 25-75 wt.%, and its film thickness is 2-100 μm, preferably 5-40 μm. When the percentage of the α-substituted stilbene compound contained in the charge transfer layer is 10-80 wt.%, preferably 25-75 wt.%, and the film thickness is 2-100 μm, preferably 5-40 μm. When the percentage of the α-substituted stilbene compound contained in the charge transfer layer is less than 10 wt.%, the sensitivity deteriorates, and when said percentage is more than 80 wt.%, an undesirable phenomena occurs in that the layer is easily broken and the layer becomes white or turbid in appearance due to the separation of crystals. When the thickness of the charge transfer layer is less than 5 μm, holding of the charge potential deteriorates, and when said thickness is more than 40 μm, the residual potential is raised.

In the electrophotographic element of the present invention, a barrier layer may be formed between the electrically conductive layer and the charge generating layer, an intermediate layer may be formed between the charge generating layer and the charge transfer layer, and an overcoat layer, may be formed on the charge transfer layer respectively, as occasion demands.

The thus constructed multilayer-type electrophotographic element, according to the present invention, as is evident from Examples and Comparative Examples referred to afterwards, has superior properties in that it is manufactured with ease, is stable in characteristics even when used repeatedly and is highly sensitive to the wavelength region of semi-conductor laser (about 800 nm) as compared with usual multilayer type electrophotographic elements.

BRIEF DESCRIPTION OF THE DRAWING

The drawing is an enlarged sectional view illustrating one embodiment of the present invention.
11 ... electrically conductive substrate
22 ... charge generating layer
33 ... charge transfer layer
44 ... photosensitive layer

DESCRIPTION OF THE PREFERRED EMBODIMENTS

Example 1

1 wt. part of trisazo pigment represented by the formula (1—1) in Table-1, 19 wt. parts of tetrahydrofuran and 6 wt. of a 5 wt.% tetrahydrofuran solution of polyvinyl butyral resin (Trade name XYHL produced by Union Carbide Plastic Company) were pulverized well in a ball mill. Next, this pulverized mixture was taken out, and was combined with 104 wt. parts of tetrahydrofuran, while stirring gently, for dilution. Next, this solution was applied on an aluminum-vapordeposited polyester film by means of a doctor blade so that wet gap might become 35 μm, and was dried at 80° C. for 5 minutes to thereby form a 1.0 μm-thick charge generating layer. A solution comprising 10 wt. parts of the α-substituted stilbene compound represented by the structural formula (2-33), 10 wt. parts of polycarbonate resin (Trade name Panlite K-1300 produced by TEIJIN KASEI K.K.), 0.002 wt. parts of silicone oil (KF-50 produced by Shinetsu Kagaku Kogyo K.K.) and 80 wt. parts of tetrahydrofuran were applied on said charge generating layer by means of a doctor blade so that wet gap might become 200 μm, and the same was dried at 80° C. for 2 minutes and then at 100° C. for 5 minutes to thereby form a 25 μm-thick charge transfer layer. Thus, electrophotographic element No. 1 was prepared.

EXAMPLES 2-22

The exact same procedure as Example 1 was followed, except that the trisazo pigments and the α-substituted stilbene compounds shown in Table-3 below were used to prepare the following electrophotographic elements.

TABLE-3

| Example No. | Electrophotographic element No. | Trisazo Pigment No. | Thickness of charge generating layer (μm) | α-substituted stilbene compound No. | Thickness of charge transfer layer (μm) |
|---|---|---|---|---|---|
| 2 | 2 | 1-1 | 1.0 | 2-6 | 20 |
| 3 | 3 | 1-1 | " | 2-81 | 19 |
| 4 | 4 | 1-2 | " | 2-9 | 24 |
| 5 | 5 | 1-2 | " | 2-57 | 20 |
| 6 | 6 | 1-3 | " | 2-22 | 18 |
| 7 | 7 | 1-3 | " | 2-36 | 21 |
| 8 | 8 | 1-4 | " | 2-3 | 17 |
| 9 | 9 | 1-4 | " | 2-14 | 19 |
| 10 | 10 | 1-5 | " | 2-58 | 20 |

TABLE-3-continued

| Example No. | Electrophotographic element No. | Trisazo Pigment No. | Thickness of charge generating layer (μm) | α-substituted stilbene compound No. | Thickness of charge transfer layer (μm) |
| --- | --- | --- | --- | --- | --- |
| 11 | 11 | 1-5 | " | 2-75 | 18 |
| 12 | 12 | 1-6 | " | 2-12 | 20 |
| 13 | 13 | 1-6 | " | 2-28 | 19 |
| 14 | 14 | 1-7 | 1.0 | 2-34 | 20 |
| 15 | 15 | 1-7 | " | 2-62 | 24 |
| 16 | 16 | 1-7 | " | 2-42 | 21 |
| 17 | 17 | 1-8 | " | 2-40 | 21 |
| 18 | 18 | 1-8 | " | 2-5 | 20 |
| 19 | 19 | 1-9 | " | 2-31 | 18 |
| 20 | 20 | 1-9 | " | 2-44 | 19 |
| 21 | 21 | 1-10 | " | 2-68 | 19 |
| 22 | 22 | 1-10 | " | 2-38 | 21 |

Example 23-26

The exact same procedure as Example 1 was followed except that the polyvinyl butyral resin was replaced by a polyester resin (Trade name VYLON 200 produced by TOYOBOSEKI K.K.) and the trisazo pigments shown in Table-4 below were used to prepare the following electrophotographic elements.

TABLE 4

| Example No. | Electrophotographic element No. | Trisazo Pigment No. | Thickness of charge generating layer (μm) | Thickness of charge-transfer layer (μm) |
| --- | --- | --- | --- | --- |
| 23 | 23 | 1-1 | 1.2 | 22 |
| 24 | 24 | 1-2 | 1.3 | 18 |
| 25 | 25 | 1-7 | 1.1 | 17 |
| 26 | 26 | 1-8 | 1.2 | 18 |

Comparative Example 1

A charge generating substance, N,N'-dimethylperylene-3,4,9,10-tetracarboxylic diimide, was vacuum vapordeposited on an aluminum plate under the conditions: the degree of vacuum=$10^{-5}$ mmHg, the temperature of vapordeposition source=350° C., and the time of vapordeposition=3 minutes, thereby forming a charge generating layer. In succession, a solution comprising 5 wt. parts of 2,5-bis(4-diethylaminophenyl)-1,3,4-oxadiazole, 5 wt. parts of polyester resin (Trade name Polyester Adhesive 49000 prepared by Du Pont Co.) and 90 wt. parts of tetrahydrofuran was applied on this charge generating layer, and the same was dried at 120° C. for 10 minutes to thereby form an approximately 10 μm-thick charge transfer layer. Thus, control electrophotographic element No. 1 was prepared.

Comparative Example 2

A solution for coating the charge generating layer was prepared by dissolving 1.08 wt. parts of Chloro Dian Blue (benzidine type pigment) used as the charge generating substance in 24.46 wt. parts of ethylenediamine, adding 20.08 wt. parts of n-butylamine to this solution while stirring, and further adding 54.36 wt. parts of tetrahydrofuran thereto. Next, this coating solution was applied on an aluminum-vapordeposited polyester film by means of a doctor blade and the same was dried at 80° C. for 5 minutes to thereby form an approximately 0.5 μm-thick charge generating layer. A solution comprising 1 wt. part of 1-phenyl-3-(4-diethylaminostyryl)-5-(4-diethylaminophenyl)-pyrazoline, 1 wt. part of polycarbonate resin (Trade name Panlite K-1300 produced by TEIJIN KASEI K.K.) and 8 wt. parts of tetrahydrofuran was applied on said charge generating layer by means of a doctor blade, and the same was dried at 80° C. for 2 minutes and successively dried at 100° C. for 5 minutes, thereby forming an about 20 μm-thick charge transfer layer. Thus, control electrophotographic element No. 2 was prepared.

Comparative Example 3

2 wt. parts of 4,4',4''-tris[2-hydroxy-3-(2-methoxyphenyl-carbamoyl)-1-naphthylazo]triphenylamine (triphenylamine type pigment) used as the charge generating substance and 98 wt. parts of tetrahydrofuran were pulverized and mixed in a ball mill. The thus obtained dispersion was applied on an aluminum-vapor-deposited polyester film by means of a doctor blade and air-dried to thereby form a 1 μm-thick charge generating layer. On the other hand, 2 wt. parts of 2,5-bis(4-diethylamiophenyl)-1,3,4-oxadiazole, 2 wt. parts of polycarbonate resin (Panlite L produced by TEIJIN KASEI K.K.) and 46 wt. parts of tetrahydrofuran were mixed. The thus obtained solution was applied on said charge generating layer by means of a doctor blade and dried at 120° C. for 10 minutes to thereby form a 10 μm-thick charge transfer layer. Thus, control electrophotographic element No. 3 was prepared.

Comparative Example 4

1 wt. part of polyester resin (Trade name Polyester Adhesive 49000 produced by Du Pont), 1 wt. part of 4,4',4''-tris[2-hydroxy-3-(2,5-dimethoxyphenyl-carbamoyl)-1-naphthylazo]triphenylamine (triphenylamine type pigment) and 26 wt. parts of tetrahydrofuran were pulverized and mixed in a ball mill. The obtained dispersion was applied on an aluminum-vapordeposited polyester film by means of a doctor blade and the same was dried at 100° C. for 10 minutes to thereby obtain control electrophotographic element No. 4 having a 7 μm-thick photosensitive layer.

Comparative Example 5

10 wt. parts of polyester resin, 10 wt. parts of 2,4,7-trinitro-9-fluorenone, 2 wt. parts of the trisazo compound (the trisazo compound disclosed in Japanese Laid Open Patent Application No. 132347/1978) where R denotes 2-methyl-4-methoxy-phenyl group in the general formula (1) of the present invention and 198 wt. parts of tetrahydrofuran were pulverized and mixed in a ball mill. The thus obtained dispersion was applied on an aluminum-vapordeposited polyester film by means of a doctor blade and dried at 100° C. for 10 minutes, thereby preparing control electrophotographic element No. 5 having a 10 μm-thick photo-sensitive layer.

The thus prepared electrophotographic elements No. 1–No. 26 and control electrophotographic elements No. 1–No. 5 were subjected to −(or +) 6 KV-corona discharge for 20 seconds by means of an electrostatic copying paper tester (SP428 Type produced by Kawaguchi Denki Works) and charged negatively or positively. Thereafter those elements were left standing in the dark for 20 seconds to measure the surface potential Vpo (volt) at that time, and in succession were exposed to radiation of the light from a tungsten lamp so that the intensity of surface illumination might become 4.5 lux. Then, the time (sec.) required until the surface potential was reduced to ½ of Vpo was measured, and the exposure amount E½ (lux.sec) was calculated respectively.

Further, each electrophotographic element was measured in the following points in order to determine the sensitivity to long wavelength light.

First, each electrophotographic element was charged by corona discharge in the dark, and then a 1 μm/cm² of monochromatic spectrum (800 nm) was radiated thereon by means of a monochrometer. Next, the time (sec) required until the surface charge decayed to ½ was measured (at this time, the decayed part of the surface charge due to dark decay was supplemented), and further the exposure amount (μw·sec/cm²) was found. Thus, the light-decay speed (volt·cm²·μw$^{-1}$·sec$^{-1}$) was calculated therefrom. These results are shown in Table-5.

to the present invention is highly sensitive to the visible region as well as being extremely sensitive to the wavelength region of semi-conductor laser (800 nm) as compared with Control electrophotographic elements No. 1–No. 5. The above electrophotographic element according to the present invention, further, is more economical to manufacture because there is no need to use the organic amine as used in manufacturing control electrophotographic element No. 2. The electrophotographic elements according to the present invention, No. 1–No. 26, were each set in an electrophotographic copying machine (FT-4700 produced by RICOH K.K.) and the image-formation was repeated 10,000 times. As the result, each electrophotographic element was found to form a clear-cut image. It may be understood from this that the electrophotographic elements according to the present invention is extremely superior in durability.

What is claimed is:

1. An electrophotographic element comprising a charge generating layer and a charge transfer layer formed on an electrically conductive substrate, wherein said charge generating layer contains a trisazo pigment having the formula (1):

TABLE-5

|  | Vpo (volt) | E½ (lux · sec) | Light-decay speed at 800 nm (volt · cm² · μw$^{-1}$ · sec$^{-1}$) |
| --- | --- | --- | --- |
| Our electrophotographic element No. 1 | 1194 | 0.7 | 1070 |
| Our electrophotographic element No. 2 | 1010 | 0.6 | 1110 |
| Our electrophotographic element No. 3 | 1198 | 0.6 | 1120 |
| Our electrophotographic element No. 4 | 1090 | 1.2 | 340 |
| Our electrophotographic element No. 5 | 1160 | 1.6 | 260 |
| Our electrophotographic element No. 6 | 894 | 2.0 | 160 |
| Our electrophotographic element No. 7 | 1278 | 2.2 | 150 |
| Our electrophotographic element No. 8 | 908 | 1.9 | 180 |
| Our electrophotographic element No. 9 | 1008 | 1.6 | 260 |
| Our electrophotographic element No. 10 | 1212 | 1.7 | 210 |
| Our electrophotographic element No. 11 | 968 | 2.1 | 150 |
| Our electrophotographic element No. 12 | 1142 | 2.1 | 160 |
| Our electrophotographic element No. 13 | 1302 | 1.9 | 190 |
| Our electrophotographic element No. 14 | 1042 | 0.6 | 1100 |
| Our electrophotographic element No. 15 | 1284 | 0.9 | 990 |
| Our electrophotographic element No. 16 | 1088 | 0.7 | 1070 |
| Our electrophotographic element No. 17 | 1170 | 1.2 | 330 |
| Our electrophotographic element No. 18 | 1184 | 1.0 | 850 |
| Our electrophotographic element No. 19 | 1254 | 1.6 | 260 |
| Our electrophotographic element No. 20 | 1190 | 1.6 | 270 |
| Our electrophotographic element No. 21 | 1160 | 1.7 | 200 |
| Our electrophotographic element No. 22 | 1048 | 2.0 | 160 |
| Our electrophotographic element No. 23 | 1039 | 0.6 | 1100 |
| Our electrophotographic element No. 24 | 983 | 1.1 | 700 |
| Our electrophotographic element No. 25 | 955 | 0.7 | 1070 |
| Our electrophotographic element No. 26 | 1012 | 1.0 | 860 |
| Control electrophotographic element No. 1 | −960 | 5.4 | 10 or less |
| Control electrophotographic element No. 2 | −603 | 1.9 | " |
| Control electrophotographic element No. 3 | −980 | 8.3 | " |
| Control electrophotographic element No. 4 | +480 | 5.4 | " |
| Control electrophotographic element No. 5 | −650 | 27.4 | " |

As is evident from the results shown in Table-5, the multilayer type electrophotographic element according

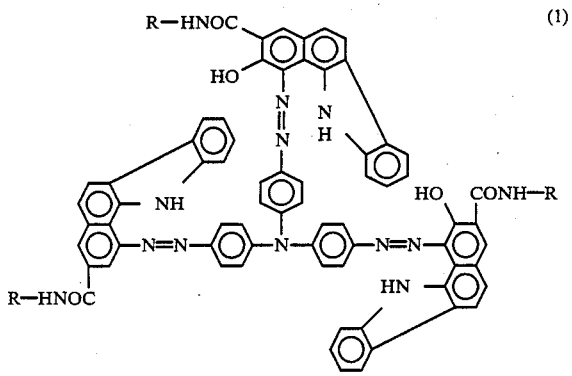
(1)

wherein R is selected from the group consisting of

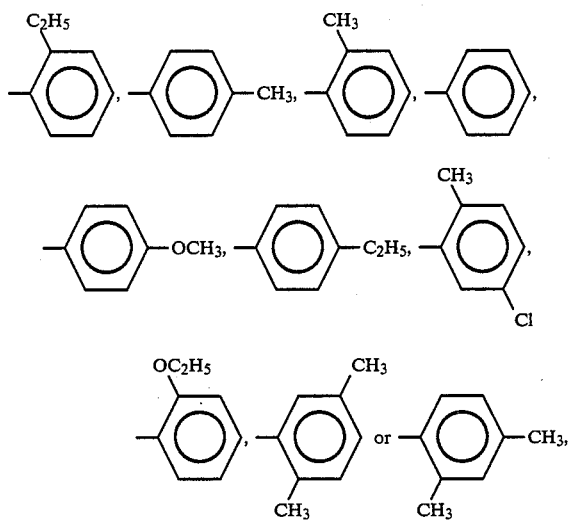

and said charge transfer layer contains an α-substituted stilbene compound having the formula (2):

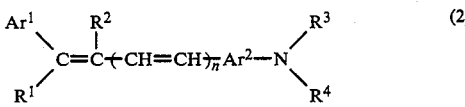

wherein $R^1$ is selected from the group consisting of substituted alkyl, unsubstituted alkyl, substituted aryl and unsubstituted aryl; $R^2$, $R^3$ and $R^4$ each is selected from the group consisting of hydrogen, substituted alkyl, unsubstituted alkyl, substituted aryl and unsubstituted aryl; $Ar^1$ is selected from the group consisting of substituted aryl and unsubstituted aryl; $Ar^2$ is selected from the group consisting of substituted arylene and unsubstituted arylene; or $Ar^1$ and $R^1$ are combined to form a ring; and n is 0 or 1,
and a resinous binder, said charge generating layer having a thickness of from 0.01 to 5 μm and containing from 10 to 100 wt. % of said trisazo pigment, said charge transfer layer having a thickness of from 2 to 100 μm and containing from 10 to 80 wt. % of said stilbene compound.

2. An electrophotographic element as claimed in claim 1, wherein said charge generating layer has a thickness of from 0.05 to 2 μm and contains from 30 to 95 wt. % of said trisazo pigment.

3. An electrophotographic element as claimed in claim 1, wherein said charge transfer layer has a thickness of from 5 to 40 μm and contains from 25 to 75 wt. % of said stilbene compound.

4. An electrophotographic element according to claim 1, wherein the substituent of the substituted alkyl group in each of $R^1$, $R^2$, $R^3$ and $R^4$ is selected from the group consisting of an alkoxy group, an aryloxy group, a substituted or unsubstituted aryl group, an alkylamino group, an arylamino group, an amino group and a hydroxy group; the unsubstituted aryl or arylene group in each of $R^1$, $R^2$, $R^3$, $R^4$, $Ar^1$ and $Ar^2$ is a carbocyclic or heterocylic, mononuclear or polynuclear aromatic residual group; and the substituent of the substituted aryl or arylene group in each of $R^1$, $R^2$, $R^3$, $R^4$, $Ar^1$ and $Ar^2$ is selected from the group consisting of an alkylamino group, an alkoxy group, an aryloxy group, an alkyl group, an amino group, a hydroxy group, a phenyl group, a halogen atom, a cyano group, a nitro group, an alkylthio group and an arylthio group.

5. An electrophotographic element according to claim 4, wherein the unsubstituted alkyl group in each of $R^1$, $R^2$, $R^3$ and $R^4$ is selected from the group consisting of methyl, ethyl, propyl, butyl, pentyl and hexyl groups; and alkoxy group as the substituent of the substituted alkyl group in each of $R^1$, $R^2$, $R^3$ and $R^4$ is selected from the group consisting of methoxy, ethoxy, propoxy, butoxy and pentyloxy groups, the aryloxy group as said substituent likewise, is selected from the group consisting of phenoxy, tolyloxy, and naphthyloxy groups, the substituted or unsubstituted aryl group as said substituent, likewise, is selected from the group consisting of phenyl, methoxy-substituted phenyl and naphyl groups, the alkylamino group as said substituent, likewise, is selected from the group consisting of N-methyl-N-ethylamino, N, N-dimethylamino and N,N-diethylamino groups, and the arylamino group as said substituent, likewise, is selected from the group consisting of N-phenylamino and N,N-diphenylamino groups; the unsubstituted aryl or arylene group in each of $R^1$, $R^2$, $R^3$, $R^4$, $Ar^1$ and $Ar^2$ is selected from the group consisting of a phenyl or phenylene group, a naphthyl or naphthylene group, and anthryl or anthrylene group, a thienyl or thienylene group, a pyridyl or pyridylene group, a furyl or furylene group and a carbazole or carbazolylene group; the alkylamino group as the substituent of the substituted aryl or arylene group in each of $R^1$, $R^2$, $R^3$, $R^4$, $Ar^1$ and $Ar^2$ is selected from the group consisting of N,N-dimethylamino, N,N-diethylamino and N,N-dipropylamino groups, the alkoxy group as said substituent, likewise, is selected from the group consisting of a methoxy, ethoxy, propoxy and butoxy groups, the aryloxy group as said substituent, likewise, is selected from the group consisting of phenoxy, tolyloxy and naphthyloxy groups, the alkyl group as said substituent, likewise, is selected from the group consisting of methyl, ethyl, propyl and butyl groups, the halogen atom as said substituent, likewise, is selected from the group consisting of chlorine and bromine atoms, the alkylthio group as said substituent, likewise, is selected from the group consisting of methylthio and ethylthio groups, and the arylthio groups as said substituent, likewise, is selected from the group consisting of phenylthio and naphthylthio groups; and the ring formed by a combination of $Ar^1$ and $R^1$ is selected from the group consisting of fluorenylidene, cyclopentadienylidene, cyclohexenylidene, cyclohexadienylidene and cyclopentedienylidene.

6. An electrophotographic element according to claim 5, wherein the ring formed by a combination of $Ar^1$ and $R^1$ is substituted by the same substituent as in said substituted aryl or arylene group.

7. An electrophotographic element according to claim 6, wherein $Ar^1$ is selected from the group consisting of phenyl, naphthyl, methoxyphenyl, tolyl, chlorophenyl, methoxynaphthyl and anthryl groups, $R^1$ is selected from the group consisting of methyl, ethyl, propyl, butyl, benzyl, methoxybenzyl, tolyl and naphthyl, $R^2$ is selected from the group consisting of hydrogen, dimethylaminophenyl, diethylaminophenyl, methyl and phenyl, $R^3$ is selected from the group consisting of methyl, benzyl, phenyl, tolyl, methoxyphenyl, chlorophenyl and ethyl groups, $R^4$ is selected from the group consisting of methyl, phenyl, tolyl, ethyl, methoxyphenyl, cyanophenyl, dimethylphenyl and benzyl groups, $Ar^2$ is selected from the group consisting of phenylene, naphthylene, thienylene, chlorophenylene, carbazolylene and tolylene groups and the ring formed by a combination of $Ar^1$ and $R^1$ is selected from the group consisting of fluorenylidene, cyclohexenylidene, cyclohexadienylidene and cyclopentadienylidene.

* * * * *